US006205554B1

(12) United States Patent
Sasaki et al.

(10) Patent No.: US 6,205,554 B1
(45) Date of Patent: Mar. 20, 2001

(54) DISPLAY CONTROL APPARATUS AND METHOD

(75) Inventors: Hideto Sasaki, Fukaya; Yoko Kondo, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/032,022

(22) Filed: Feb. 27, 1998

(30) Foreign Application Priority Data

Feb. 28, 1997 (JP) .................................................... 9-046167

(51) Int. Cl.[7] ...................................................... G06F 11/00
(52) U.S. Cl. ............................................................. 713/202
(58) Field of Search .................................... 713/202, 200, 713/201; 380/4, 5, 6–8, 10, 23, 25, 49; 348/94, 33, 92, 89, 122; 340/825.34, 825.31; 709/224, 225

(56) References Cited

U.S. PATENT DOCUMENTS 5,489,918 * 2/1996 Mosier ................................... 345/89
5,528,401 * 6/1996 Narutaki et al. ....................... 359/76
5,644,415 * 7/1997 Aoki et al. ........................... 349/122
5,835,074 * 11/1998 Didier et al. ........................... 345/94
5,897,187 * 4/1999 Aoki et al. ........................... 349/144

FOREIGN PATENT DOCUMENTS 2 693 815 1/1994 (FR) .
6-296153 10/1994 (JP) .
9-5766 1/1997 (JP) .
95/27973 10/1995 (WO) .

OTHER PUBLICATIONS

Patent Abstracts of Japan, vol. 016, No. 155 (P–1338), Apr. 16, 1992 & JP 04 007627 A (Shimadzu Corp.), Jan. 13 1992.

* cited by examiner

*Primary Examiner*—Nadeem Iqbal
(74) *Attorney, Agent, or Firm*—Pillsbury Madison & Sutro LLP

(57) ABSTRACT

A display control apparatus of this invention includes a touch panel for inputting a predetermined input, a liquid crystal monitor for displaying and switching a plurality of operation screen to display a desired operation screen in accordance with the predetermined input inputted by the touch panel, and a control unit for, when the operation screen to be displayed on the liquid crystal monitor in accordance with the predetermined input inputted by the touch panel corresponds to a password input screen for receiving input of a password, controlling the field angle of the liquid crystal monitor to a predetermined field angle.

15 Claims, 3 Drawing Sheets

DISPLAY CONTROL APPARATUS AND METHOD

BACKGROUND OF THE INVENTION

The present invention relates to a display control apparatus and method applied to an automatic teller machine set in a financial institution such as a bank.

An automatic teller machine set in a financial institution such as a bank has a liquid crystal monitor having a touch panel. A transaction selection screen, a password input screen, or an amount input screen is displayed on this liquid crystal monitor. The transaction selection screen receives the transaction selected by the user. The password input screen receives input of the password of the user. The amount input screen receives input of the amount of deposit/withdrawal from/to the user.

Assume that the transaction selection screen is displayed on the liquid crystal monitor. Items such as "deposit", "withdrawal", "transfer", and the like are displayed on this transaction selection screen. When the user designates the display position of a predetermined item through the touch panel, a transaction corresponding to the designated display position, i.e., transaction of a predetermined item is received. Such a user interface for receiving input from the user is formed in the automatic teller machine by combining the touch panel and liquid crystal monitor.

Contents to be input through this user interface include secret information such as a password. Users must sometimes wait their turns to use the automatic teller machine. In such a case, the next user at the automatic teller machine normally waits for his/her turn behind the previous user who is using the automatic teller machine. When the previous user is using the automatic teller machine, the next user may look at the liquid crystal monitor, and consequently, the secret matters may leak.

BRIEF SUMMARY OF THE INVENTION

It is an object of the present invention to provide a display control apparatus and method capable of preventing contents input through a liquid crystal monitor from leaking to a third party.

According to an aspect of the present invention, there is provided a display control apparatus comprising liquid crystal display means for displaying and switching a plurality of operation screen to display a desired operation screen in accordance with a predetermined input, input means for inputting the predetermined input arranging on said liquid crystal display means, and field angle control means for, when the operation screen to be displayed on the liquid crystal display means in accordance with the predetermined input inputted by the input means corresponds to a specific operation screen for receiving input of specific data, controlling a field angle of the liquid crystal display means to a predetermined field angle.

According to another aspect of the present invention, there is provided a display control method comprising the first step of inputting a predetermined input, and the second step of, when an operation screen to be displayed on liquid crystal display means in accordance with the predetermined input inputted in the first step corresponds to a specific operation screen for receiving input of specific data, controlling a field angle of the liquid crystal display means to a predetermined field angle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below in detail with reference to the accompanying drawing.

Figure 1:
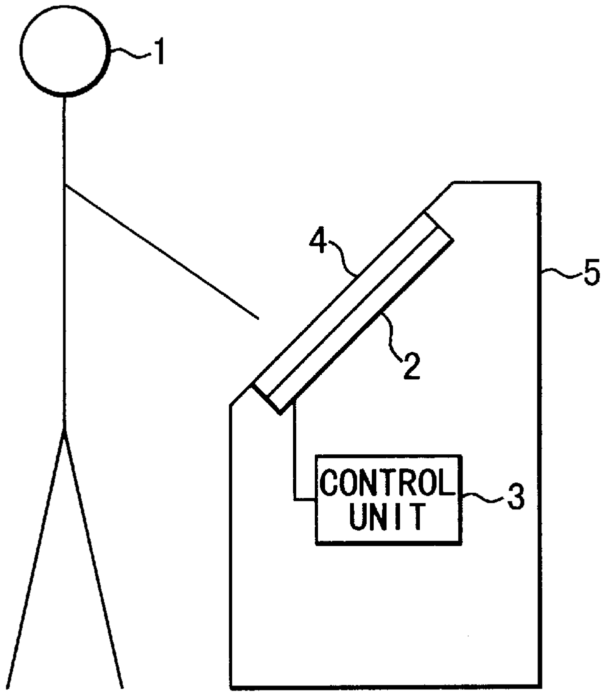
FIG. 1 is a view schematically showing an automatic teller machine as a display control apparatus according to an embodiment of the present invention.

FIG. 1 is a view schematically showing an automatic teller machine as a display control apparatus according to an embodiment of the present invention.

As shown in FIG. 1, an automatic teller machine 5 has a liquid crystal monitor (liquid crystal display means) 2 having a touch panel 4, and a control unit (field angle control means and control means) 3. A user interface (input reception means) for receiving input from a user is formed by combining the touch panel 4 and the liquid crystal monitor 2.

The control unit (CPU) 3 performs various control for the automatic teller machine 5. Under the control of the control unit 3, the operation screen displayed on the liquid crystal monitor 2 is switched. The control unit 3 also controls the field angle of the liquid crystal monitor 2. Field angle control for the liquid crystal monitor 2 will be described later in detail.

The liquid crystal monitor 2 comprises, e.g., an active matrix liquid crystal display panel using a thin-film transistor (TFT). The liquid crystal monitor 2 displays various operation screen under the control of the control unit 3.

A user 1 inputs necessary information through the touch panel 4 while observing the operation screen displayed on the liquid crystal monitor 2. The information input through the touch panel 4 is sent to the control unit 3. The control unit 3 causes the liquid crystal monitor 2 to display a predetermined operation screen in accordance with the input information.

Figure 2:
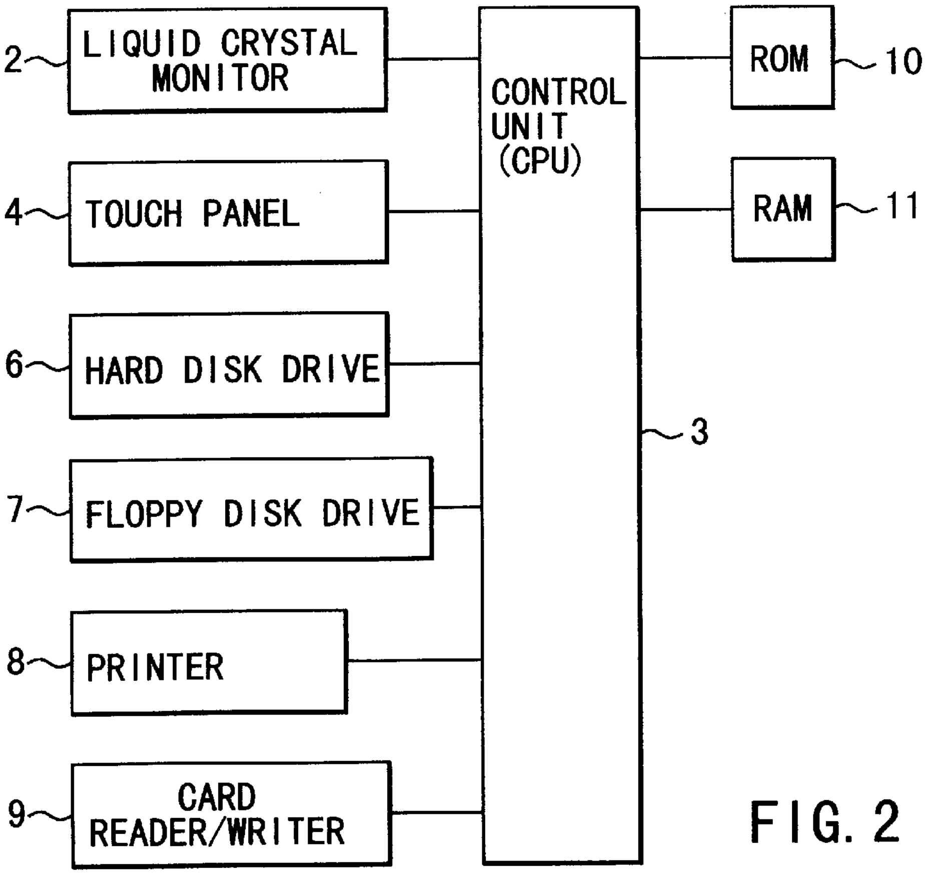
FIG. 2 is a block diagram showing the schematic arrangement of the automatic teller machine.

FIG. 2 is a block diagram showing the schematic arrangement of the automatic teller machine.

As shown in FIG. 2, the automatic teller machine 5 has the control unit 3. This control unit 3 is connected to the liquid crystal monitor 2, the touch panel 4, a hard disk drive 6, a floppy disk drive 7, a printer 8, a card reader/writer 9, a ROM 10, and a RAM 11. The card reader/writer 9 reads out information recorded in various cards (e.g., an IC card or magnetic card) and writes predetermined information in the cards.

A liquid crystal panel (corresponding to the liquid crystal monitor 2) and a CRT display panel will be briefly compared. Generally, the field angle of the liquid crystal display panel is smaller than that of the CRT display panel. For this reason, the drive circuit of the liquid crystal display panel controls the display screen to obtain high contrast. More specifically, the drive circuit of the liquid crystal display panel performs control such that the difference in light emission luminance between the background portion and character portion of the display screen becomes large. That is, to increase the field angle, the difference in light emission luminance between the background portion and character portion of the display screen is increased. Under such control, the liquid crystal display panel obtains a maximum field angle. Conversely, when the difference in light emission luminance between the background portion and character portion of the display screen is controlled to be small, the field angle of the liquid crystal display panel becomes small.

Normally, to obtain consistency in design of the display screen, the basic design of the display screen is not changed even when the contents displayed on the display screen are switched. In the present invention, for a specific operation screen where security must be ensured, the field angle of this specific operation screen is made small under the above-described field angle control, thereby preventing a third party from looking at contents input through the specific operation screen. The specific operation screen where security must be ensured is a password input screen or an amount input screen.

Figure 3:
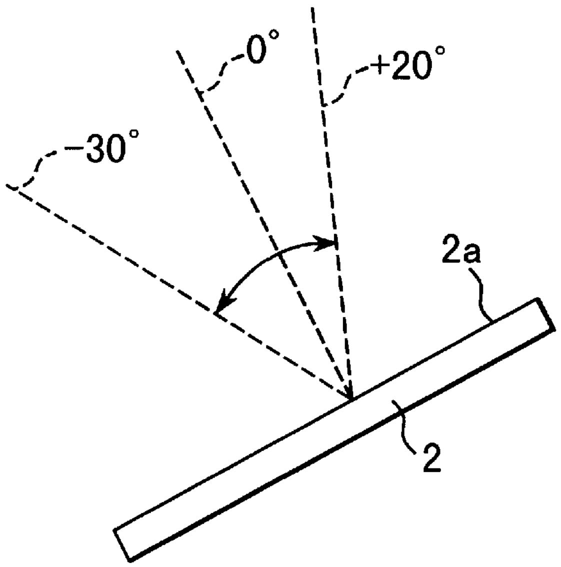
FIG. 3 is a view for explaining the field angle of a liquid crystal monitor.

When the field angle of the operation screen displayed on the liquid crystal monitor 2 is not controlled to be small (when the operation screen is controlled to a normal field angle), the monitor 2 has a field angle shown in FIG. 3. The field angle of the liquid crystal monitor 2 controlled to the normal field angle is +20° to −30°. In FIG. 3, the direction perpendicular to a display surface 2*a* of the liquid crystal monitor 2 is defined as 0°. When the contrast of the operation screen looked at from the direction (0°) perpendicular to the liquid crystal monitor 2 controlled to the normal field angle is assumed to be 1, the contrast of the operation screen viewed from the direction of the upper limit angle (+20°) or lower limit angle (−30°) is 1/10.

When the field angle of the operation screen displayed on the liquid crystal monitor 2 is controlled to be small (when the operation screen is controlled to a special field angle), the field angle of the monitor 2 is, e.g., 1/10 the normal field angle. When the contrast of the operation screen looked at from the direction (0°) perpendicular to the liquid crystal monitor 2 controlled to the normal field angle is assumed to be 1, the contrast of the operation screen viewed from the direction perpendicular to the liquid crystal monitor 2 controlled to the special field angle is 1/10. When the liquid crystal monitor 2 controlled to the special field angle is looked at from the direction perpendicular to the monitor 2, the contents displayed on the operation screen can be sufficiently confirmed.

When the contrast of the operation screen looked at from the direction (0°) perpendicular to the liquid crystal monitor 2 controlled to the normal field angle is assumed to be 1, the contrast of the operation screen when the liquid crystal monitor 2 controlled to the special field angle is viewed from the direction of the upper limit angle (+20°) or lower limit angle (−30°) is 1/100. That is, when the liquid crystal monitor 2 controlled to the special field angle is viewed from the direction of the upper limit angle (+20°) or lower limit angle (−30°), the contents displayed on the operation screen cannot be confirmed. More specifically, it is seemed as if nothing were displayed on the operation screen.

Figure 4A:
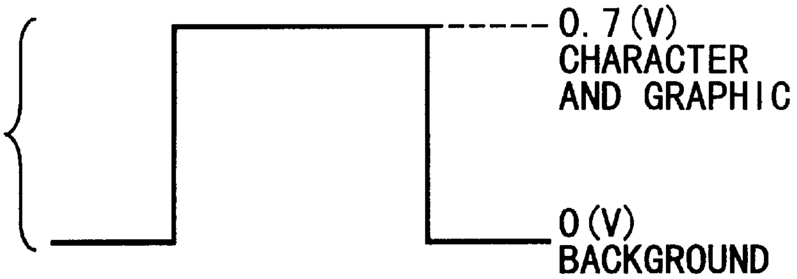
FIG. 4A is a graph for explaining a video signal supplied to the liquid crystal monitor controlled to a normal field angle.
Figure 4B:
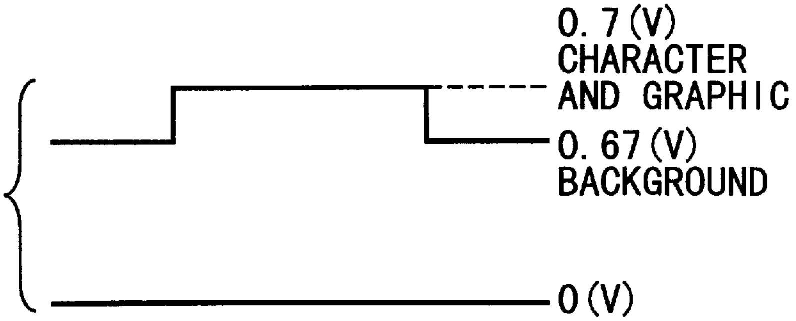
FIG. 4B is a graph for explaining a video signal supplied to the liquid crystal monitor controlled to a special field angle.

To obtain the maximum luminance on the operation screen of the liquid crystal monitor 2 (to control the liquid crystal monitor 2 to the normal field angle), video signals of signal levels as shown in FIG. 4A are input to the liquid crystal monitor 2. A video signal corresponding to the character and graphic portions of the operation screen is set at a signal level (amplitude) of 0.7 (V), and a video signal corresponding to the background of the operation screen is set at a signal level (amplitude) of 0 V. The relationship between a luminance y (cd/m$^2$) of the liquid crystal monitor 2 and a signal level x (V) of the input video signal is represented by:

$$y=(x/0.7)^{2.2}\times 200 \quad (1)$$

Therefore, when the liquid crystal monitor 2 is controlled to the normal field angle, the luminance of the character and graphic portions of the operation screen of the monitor 2 is 200 (cd/m$^2$). When the liquid crystal monitor 2 is controlled to the normal field angle, the luminance of the background portion of the operation screen of the monitor 2 is 0 (cd/m$^2$). Hence, when the liquid crystal monitor 2 is controlled to the normal field angle, the difference in luminance between the character and graphic portions and the background portion of the operation screen of the liquid crystal monitor 2 is 200 (cd/m$^2$).

On the other hand, to control the liquid crystal monitor 2 to the special field angle, video signals of the following signal levels are input to the liquid crystal monitor 2. The video signal corresponding to the character and graphic portions of the operation screen is set at a signal level (amplitude) of 0.7 (V), and the video signal corresponding to the background of the operation screen is set at a signal level (amplitude) of 0.67 V.

When the liquid crystal monitor 2 is controlled to the special field angle, the luminance of the character and graphic portions of the operation screen of the monitor 2 is 200 (cd/m$^2$). When the liquid crystal monitor 2 is controlled to the special field angle, the luminance of the background portion of the operation screen of the monitor 2 is 180 (cd/m$^2$). Therefore, when the liquid crystal monitor 2 is controlled to the special field angle, the difference in luminance between the character and graphic portions and the background portion of the operation screen of the monitor 2 is 20 (cd/m$^2$). This luminance difference is 1/10 that obtained by controlling the liquid crystal monitor 2 to the normal field angle.

As described above, when the signal level of the video signal to be supplied to the liquid crystal monitor 2 is controlled, the contrast of the operation screen is controlled. As a result, the field angle of the liquid crystal monitor 2 is controlled.

Figure 5:
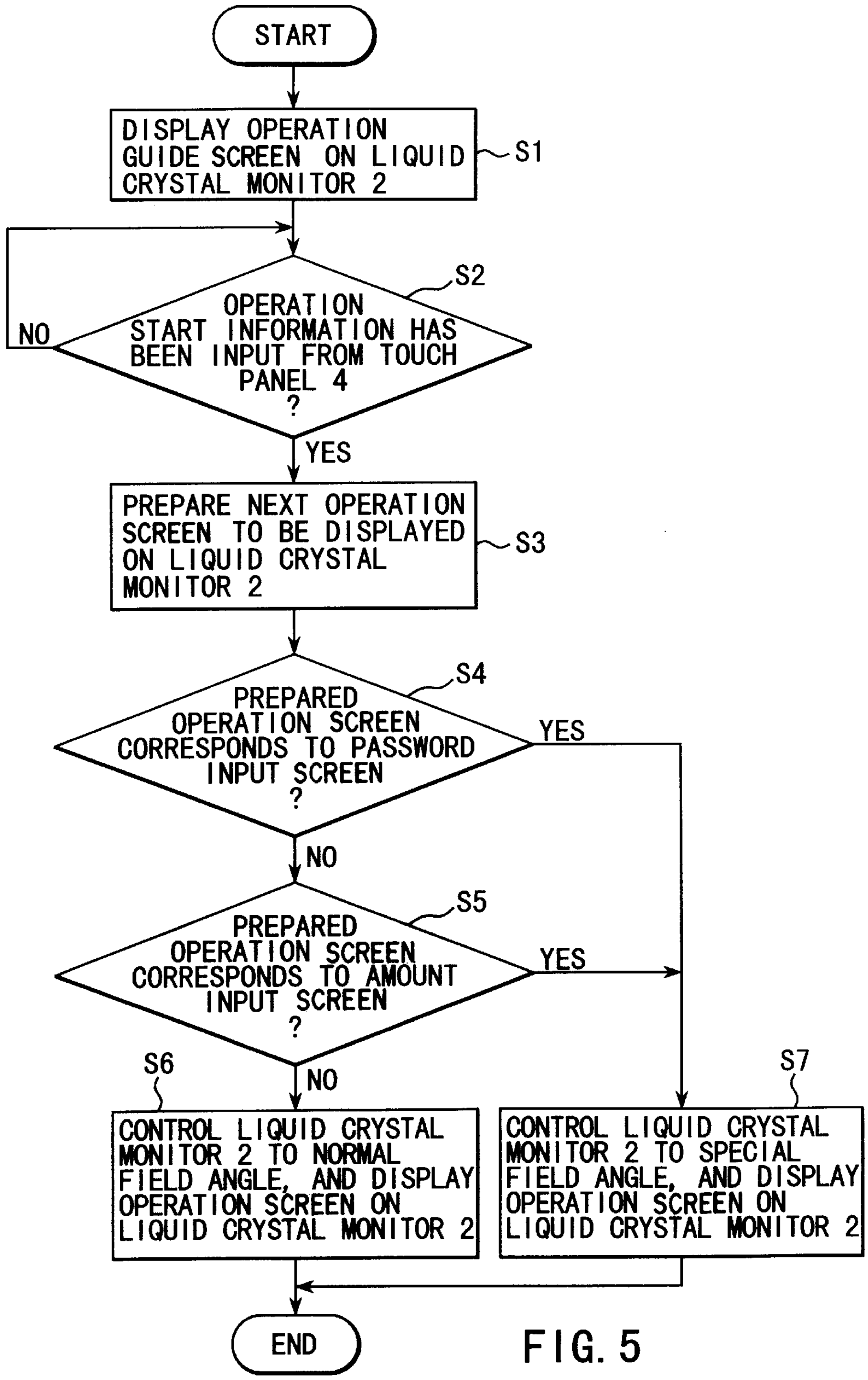
FIG. 5 is a flow chart for explaining field angle control for the liquid crystal monitor of the automatic teller machine.

Field angle control for the liquid crystal monitor of the automatic teller machine will be described next. FIG. 5 is a flow chart for explaining field angle control for the liquid crystal monitor of the automatic teller machine.

In step S1, under the control of the control unit 3, an operation guide screen is displayed on the liquid crystal monitor 2. In this step S1, a commercial screen may be displayed in place of the operation guide screen.

In step S2, it is determined whether operation start information has been input through the touch panel 4. Information input through the touch panel 4 is supplied to the control unit 3. As a consequence, the control unit 3 determines whether operation start information has been input through the touch panel 4. It is determined on the basis of the determination result in step S2 whether the automatic teller machine 5 is to be used. If it is determined in step S2 that the operation start information has been input through the touch panel 4 (YES in step S2), the next operation screen to be displayed on the liquid crystal monitor 2 is prepared (step S3). This preparation is made by the control unit 3.

In step S4, it is determined whether the operation screen prepared in step S3 is a password input screen. If the prepared operation screen corresponds to a password input screen (YES in step S4), the liquid crystal monitor 2 is controlled to the special field angle by the control unit 3 (step S7). More specifically, a video signal of 0.7 (V) corresponding to the character and graphic portions and a video signal of 0.67 (V) corresponding to the background are supplied to the liquid crystal monitor 2. Then, the operation screen is displayed on the liquid crystal monitor 2 in accordance with the video signal of 0.7 (V) corresponding to the character and graphic portions and the video signal of 0.67 (V) corresponding to the background.

If it is determined that the prepared operation screen does not correspond to the password input screen (NO in step S4), the flow advances to step S5. It is determined in step S5 whether the operation screen prepared in step S3 is an amount input screen. If the prepared operation screen corresponds to an amount input screen (YES in step S5), the liquid crystal monitor 2 is controlled to the special field angle by the control unit 3 (step S7). More specifically, a video signal of 0.7 (V) corresponding to the character and graphic portions and a video signal of 0.67 (V) corresponding to the background are supplied to the liquid crystal monitor 2. So, the operation screen is displayed on the liquid crystal monitor 2 in accordance with the video signal of 0.7 (V) corresponding to the character and graphic portions and the video signal of 0.67 (V) corresponding to the background.

If it is determined that the prepared operation screen does not correspond to the amount input screen (NO in step S5), the liquid crystal monitor 2 is controlled to the normal field angle by the control unit 3 (step S6). More specifically, a video signal of 0.7 (V) corresponding to the character and graphic portions and a video signal of 0 (V) corresponding to the background are supplied to the liquid crystal monitor 2. Consequently, the operation screen is displayed on the liquid crystal monitor 2 in accordance with the video signal of 0.7 (V) corresponding to the character and graphic portions and the video signal of 0 (V) corresponding to the background.

As has been described above, according to the present invention, when the operation screen to be displayed on the liquid crystal monitor 2 corresponds to a specific operation screen (password input screen or amount input screen), the liquid crystal monitor 2 is controlled to the special field angle. When the operation screen to be displayed on the liquid crystal monitor 2 does not correspond to the specific operation screen (password input screen or amount input screen), the liquid crystal monitor 2 is controlled to the normal field angle.

With this arrangement, information such as the password input on the password input screen or amount input on the amount input screen can be prevented from leaking to a third party. That is, even when a third party who is awaiting use of the automatic teller machine behind the user who is using the automatic teller machine looks at the operation screen, he or she cannot make out the contents of operation screen.

The present invention is also characterized in that the liquid crystal monitor is not always controlled to the special field angle. If the liquid crystal monitor is always controlled to the special field angle, the liquid crystal monitor of an automatic teller machine which is not being operated seems to display nothing. This may mislead users to make them think that the automatic teller machine has come to a stop or has malfunctions.

However, in the present invention, when an operation screen which does not correspond to the specific operation screen is displayed, the liquid crystal monitor is controlled to the normal field angle. Owing to this, misguiding users that the automatic teller machine has come to a stop or has malfunctions can be avoided by displaying an operation guide screen or commercial screen on the liquid crystal monitor of the automatic teller machine which is not being operated.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display control apparatus comprising:

liquid crystal display means for selecting one of a plurality of operation screens and displaying the selected operation screen in accordance with a predetermined input;

input means, associated with said display means, for inputting a predetermined input;

first control means for, when the operation screen to be displayed on said liquid crystal display means in accordance with the predetermined input does not correspond to a particular operation screen, controlling the field angle of said liquid crystal display means to be a first field angle; and second control means for, when the operation screen to be displayed on said liquid crystal display means in accordance with the predetermined input corresponds to the particular operation screen, controlling the field angle of said liquid crystal display means to be a second field angle smaller than the first field angle.

2. An apparatus according to claim 1, wherein said first control means comprises means for, when the operation screen to be displayed on said liquid crystal display means in accordance with the predetermined input does not correspond to a password input screen for receiving input of a password, controlling the field angle of said liquid crystal display means to be the first field angle; and said second control means comprises means for, when the operation screen to be displayed on said liquid crystal display means in accordance with the predetermined input corresponds to the password input screen, controlling the field angle of said liquid crystal display means to be the second field angle.

3. An apparatus according to claim 1, wherein said first control means comprises means for, when the operation screen to be displayed on said liquid crystal display means in accordance with the predetermined input does not correspond to an amount input screen for receiving input of an amount, controlling the field angle of said liquid crystal display means to be the first field angle; and said second control means comprises means for, when the operation screen to be displayed on said liquid crystal display means in accordance with the predetermined input corresponds to the amount input screen, controlling the field angle of said liquid crystal display means to be the second field angle.

4. An apparatus according to claim 1, wherein said first control means comprises means for, when the operation screen to be displayed on said liquid crystal display means in accordance with the predetermined input does not correspond to the particular operation screen, controlling a contrast of the operation screen to be displayed on said liquid crystal display means to be a first contrast; and said second control means comprises means for, when the operation screen to be displayed on said liquid crystal display means in accordance with the predetermined input corresponds to the particular operation screen, controlling the contrast of the operation screen to be displayed on said liquid crystal display means to be a second contrast lower than the first contrast.

5. An apparatus according to claim 1, wherein said first control means comprises means for, when the operation screen to be displayed on said liquid crystal display means in accordance with the predetermined input does not correspond to a password input screen for receiving input of a password, controlling a contrast of the operation screen to be displayed on said liquid crystal display means to be a first contrast; and said second control means comprises for, when the operation screen to be displayed on said liquid crystal display means in accordance with the predetermined input corresponds to the password input screen, controlling the contrast of the operation screen to be displayed on said liquid crystal display means to be a second contrast lower than the first contrast.

6. An apparatus according to claim 1, wherein said first control means comprises means for, when the operation screen to be displayed on said liquid crystal display means in accordance with the predetermined input does not correspond to an amount input screen for inputting an amount, controlling a contrast of the operation screen to be displayed on said liquid crystal display means to be a first contrast; and said second control means comprises means for, when the operation screen to be displayed on said liquid crystal display means in accordance with the predetermined input corresponds to the amount input screen, controlling the contrast of the operation screen to be displayed on said liquid crystal display means to be a second contrast lower than the first contrast.

7. An apparatus according to claim 1, wherein said first control means comprises means for, when the operation screen to be displayed on said liquid crystal display means in accordance with the predetermined input does not correspond to the particular operation screen, controlling a signal level of a video signal for displaying a background of the operation screen, which is to be supplied to said liquid crystal display means, to be a first signal level, and said second control means comprises means for, when the operation screen to be displayed on said liquid crystal display means in accordance with the predetermined input corresponds to the particular operation screen, controlling the signal level of the video signal for displaying the background of the operation screen, which is to be supplied to said liquid crystal display means, to be a second signal level higher than the first signal level.

8. An apparatus according to claim 1, wherein said first control means comprises means for, when the operation screen to be displayed on said liquid crystal display means in accordance with the predetermined input does not correspond to a password input screen for receiving input of a password, controlling a signal level of a video signal for displaying a background of the operation screen, which is to be supplied to said liquid crystal display means, to be a first signal level, and said second control means comprises means for, when the operation screen to be displayed on said liquid crystal display means in accordance with the predetermined input corresponds to the password input screen, controlling the signal level of the video signal for displaying the background of the operation screen, which is to be supplied to said liquid crystal display means, to be a second signal level higher than the first signal level.

9. An apparatus according to claim 1, wherein said first control means comprises means for, when the operation screen to be displayed on said liquid crystal display means in accordance with the predetermined input does not correspond to an amount input screen for receiving input of an amount, controlling a signal level of a video signal for displaying a background of the operation screen, which is to be supplied to said liquid crystal display means, to be a first signal level; and said second control means comprises means for, when the operation screen to be displayed on said liquid crystal display means in accordance with the predetermined input inputted by said input means corresponds to the amount input screen, controlling the signal level of the video signal for displaying the background of the operation screen, which is to be supplied to said liquid crystal display means, to be a second signal level higher than the first signal level.

10. A method for controlling a liquid crystal display capable of displaying a plurality of operation screens comprising:

receiving a user input;

selecting one of the plurality of operation screens for display in accordance with the user input;

displaying the selected operation screen;

controlling a field angle of said liquid crystal display to be a first field angle when the operation screen to be displayed on said liquid crystal display in accordance with the user input does not correspond to a particular operation screen; and controlling the field angle of said liquid crystal display to be a second field angle smaller than the first field angle when the operation screen to be displayed on said liquid crystal display in accordance with the user input corresponds to the particular operation screen.

11. A method according to claim 10, wherein controlling the field angle of said liquid crystal display to be the first field angle when the operation screen to be displayed on said liquid crystal display in accordance with the user input does not correspond to a password input screen for receiving input of a password and an amount input screen for receiving input of an amount; and controlling the field angle of said liquid crystal display to be the second field angle when the operation screen to be displayed on said liquid crystal display in accordance with the user input corresponds to the password input screen; and controlling the field angle of said liquid crystal display to be the second field angle when the operation screen to be displayed on said liquid crystal display in accordance with the user input corresponds to the amount input screen.

12. A method according to claim 10, wherein controlling a contrast of the operation screen to be displayed on said liquid crystal display to be a first contrast when the operation screen to be displayed on said liquid crystal display in accordance with the user input does not correspond to the particular operation screen; and controlling the contrast of the operation screen to be displayed on said liquid crystal display to be a second contrast lower than the first contrast when the operation screen to be displayed on said liquid crystal display in accordance with the user input corresponds to the particular operation screen.

13. A method according to claim 10, wherein controlling a contrast of the operation screen to be displayed on said liquid crystal display to be a first contrast when the operation screen to be displayed on said liquid crystal display in accordance with the user input does not correspond to a password input screen for receiving input of a password and an amount input screen for receiving input of an amount; and controlling the contrast of the operation screen to be displayed on said liquid crystal display to a second contrast lower than the first contrast when the operation screen to be displayed on said liquid crystal display in accordance with the user input corresponds to the password input screen; and controlling the contrast of the operation screen to be displayed on said liquid crystal display to the second contrast when the operation screen to be displayed on said liquid crystal display in accordance with the user input corresponds to the amount input screen.

14. A method according to claim 10, wherein controlling a signal level of a video signal for displaying a background of the operation screen, which is to be supplied to said liquid crystal display, to be a first signal level when the operation screen to be displayed on said liquid crystal display in accordance with the user input does not correspond to the specific operation screen; and controlling the signal level of the video signal for displaying the background of the operation screen, which is to be supplied to said liquid crystal display, to be a second signal level higher than the first signal level when the operation screen to be displayed on said liquid crystal display in accordance with the user input corresponds to the specific operation screen.

15. A method according to claim 10, wherein controlling a signal level of a video signal for displaying a background of the operation screen, which is to be supplied to said liquid crystal display, to be a first signal level when the operation screen to be displayed on said liquid crystal display in accordance with the user input does not correspond to a password input screen for receiving input of a password and an amount input screen for receiving input of an amount; and controlling the signal level of the video signal for displaying the background of the operation screen, which is to be supplied to said liquid crystal display, to be a second signal level higher than the first signal level when the operation screen to be displayed on said liquid crystal display in accordance with the user input corresponds to the password input screen; and controlling the signal level of the video signal for displaying the background of the operation screen, which is to be supplied to said liquid crystal display, to be the second signal level when the operation screen to be displayed on said liquid crystal display in accordance with the user input corresponds to the amount input screen.

* * * * *